United States Patent [19]

Ezoe et al.

[11] 3,820,619
[45] June 28, 1974

[54] ELECTRIC CONTROL CIRCUITRY FOR VEHICLE POWER STEERING DEVICE

[75] Inventors: Mitsuhiko Ezoe; Naohiko Inoue, both of Yokohama, Japan

[73] Assignee: Nissan Motor Company Limited, Yokohama City, Japan

[22] Filed: Feb. 2, 1973

[21] Appl. No.: 329,067

[30] Foreign Application Priority Data
Feb. 5, 1972    Japan.............................. 47-12553

[52] U.S. Cl.......... 180/79.2 R, 317/16, 317/33 SC, 317/33 VR, 317/41
[51] Int. Cl............................................. B62d 5/06
[58] Field of Search.......... 180/79.2 R, 79.1, 105 E, 180/105, 82 R; 317/16, 33 SC, 31, 33 VR, 40, 41, 131

[56] References Cited
UNITED STATES PATENTS
2,987,135   6/1961   Harvey........................... 180/79.2 R
3,011,579   12/1961  Milliken......................... 180/79.2 R
3,256,951   6/1966   Hart.............................. 180/79.2 R
3,692,137   9/1972   Inoue............................ 180/79.2 R

*Primary Examiner*—J. D. Miller
*Assistant Examiner*—Patrick Salce

[57] ABSTRACT

A temperature-compensating circuit comprising a thermistor and a resistor connected in parallel to each other, the parallel combination being connected in series with a solenoid coil of a modulator valve. A vehicle speed sensor generates an AC current with a frequency proportional to vehicle speed. The AC current is converted by an F-V converter into a DC current of a magnitude proportional thereto which is then supplied to a constant-voltage control circuit so as to be converted into a voltage signal corresponding thereto. The voltage signal is supplied across the solenoid coil and the temperature-compensating circuit to cause a flow of current through the coil that corresponds exactly to the vehicle speed irrespective of the variations in the resistance of the coil which would otherwise result from changes in the surrounding temperature.

10 Claims, 6 Drawing Figures

PATENTED JUN 28 1974 3,820,619
SHEET 1 OF 4
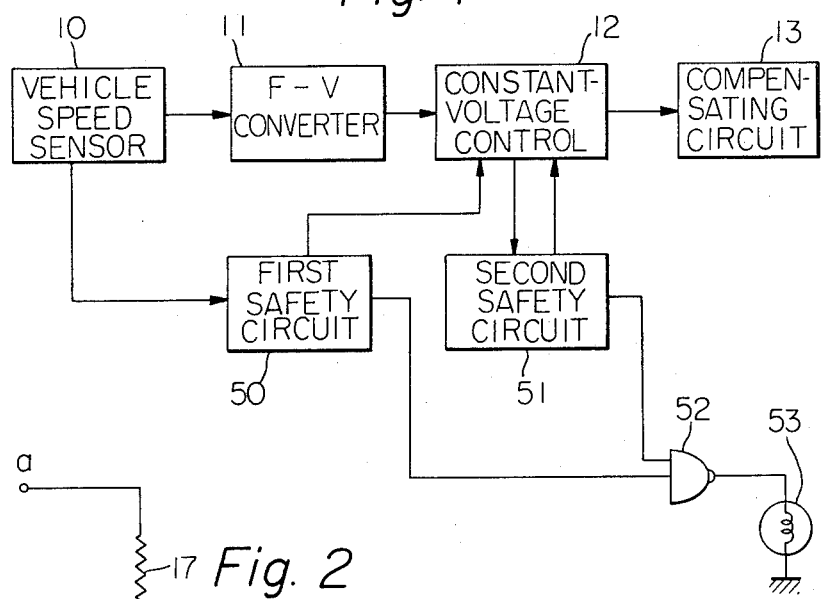
Fig. 1
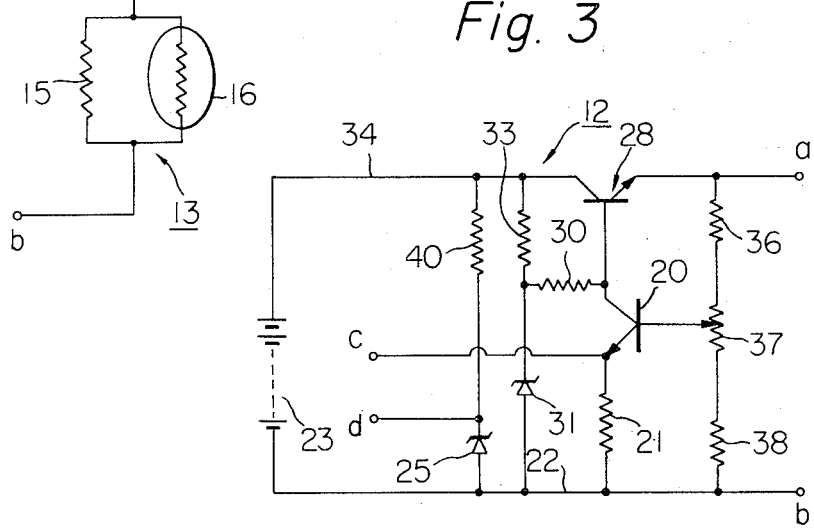
Fig. 2
Fig. 3

ELECTRIC CONTROL CIRCUITRY FOR VEHICLE POWER STEERING DEVICE

This invention relates generally to a vehicle power steering device and more particularly to an electric control circuitry for such device that varies the resistance to turning the steering wheel in accordance with vehicle speed.

Heretofore, many hydraulic power steering devices have been developed for use on vehicles. Such steering devices usually comprise a hydraulic reaction assembly which applies a reaction to the steering wheel that is proportional to the steering effort so as to give the vehicle driver a steering feel when driving the vehicle. Furthermore, in order to ensure safety during high speed driving, these power steering devices are designed to have the reaction dependent upon vehicle speed in such a manner that the resistance to turning the steering wheel increases with vehicle speed. To accomplish this, a modulator valve functions as an electrohydraulic converter that controls or modulates the pressure to be supplied to the reaction assembly in accordance with the vehicle speed. The modulator valve usually includes a solenoid coil through which a current proportional to vehicle speed flows, and a differential amplifier for compensating for the variations in the resistance of the coil that would otherwise result from changes in the surrounding temperature. However, the devices of this type have some serious disadvantages. (1) Losses of power occurring where the current is detected are of such magnitude as to exclude their adaptation for use on motor vehicle equipped with a battery. (2) Due to changes in the battery's supply voltage, provision of a constant-voltage circuit is necessary. (3) The differential amplifier makes the arrangement considerably complicated and expensive.

It is, therefore, an object of the present invention to provide an electric control circuitry for a vehicle power steering device with a view of overcoming the above-stated disadvantages.

Another object of the present invention is to provide an electric control circuitry connected with a modulator valve for modulating the level of hydraulic pressure supplied to a reaction assembly.

It is a further object of the present invention to provide an electric control circuitry for producing a vehicle speed dependent current fed to a solenoid coil of the modulator valve in spite of the variations in the resistance of the coil which woul otherwise result from changes in the surrounding temperature.

It is still another object of the present invention to provide an electric control circuitry of the aforementioned type which functions to automatically increase the hydraulic pressure supplied to the reaction assembly for the sake of safety if the control circuitry malfunctions.

It is still another object of the present invention to provide an electric control circuitry of the aforementioned type which is simple in construction, inexpensive to manufacture and reliable in operation.

In accordance with one feature of the invention, there is provided an electric control circuitry for a vehicle power steering device that comprises a temperature compensating circuit including a parallel combination of a thermistor and a resistor, the combination being connected in series with the resistor of the modulator valve's solenoid coil. An F-V converter is provided for converting an AC current with a frequency proportional to vehicle speed into a DC current of a magnitude proportional thereto. The DC current is supplied to a constant-voltage control circuit where it provides a reference potential for the control circuit to produce a voltage output corresponding to vehicle speed. The voltage output of the control circuit is then supplied across the solenoid coil and the temperature-compensating circuit to thereby cause a flow of current through the solenoid coil that is exactly proportional to vehicle speed irrespective of the variations in the resistance of the coil which would otherwise result from changes in the surrounding temperature.

In accordance with another feature of the invention, first and second safety circuits are provided for detecting certain malfunctions in a vehicle speed sensor and the constant-voltage control circuit, respectively. Upon detection of malfunctions, these safety circuits function to disable the constant-voltage control circuit in a manner to reduce the output voltage to zero. When this occurs, the hydraulic pressure applied to the reaction assembly is increased to thereby increase the resistance to turning the steering wheel for the driver's safety.

These and other features and advantages will be readily apparent from the following description of the invention taken in conjunction with the accompanying drawings, in which:

FIG. 1 is a block diagram of an electric control circuitry embodying the invention;

FIG. 2 is a circuit diagram of the modulator valve's solenoid coil and a temperature-compensating circuit connected thereto;

FIG. 3 is an illustration of a constant-voltage control circuit shown in block form in FIG. 1;

Figure 4:
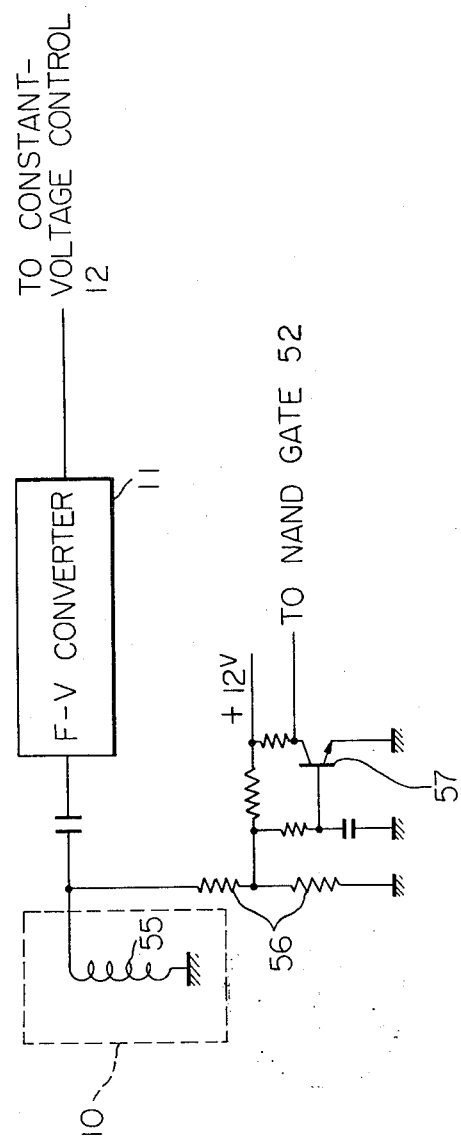
FIG. 4 is an illustration of a first safety circuit employed in the device of FIG. 1.

A simplified block diagram of the overall arrangement of the device according to the invention is shown in FIG. 1.

The device as depicted includes a vehicle speed sensor 10 for sensing vehicle speed to generate an electric signal indicative thereof. In this embodiment, the vehicle speed sensor 10 is of a conventional type capable of generating an alternating current (AC) signal with a frequency proportional to the rotational speed of a vehicle wheel. The vehicle speed sensor 10 is connected to an F-V converter 11 which functions to respond to the AC signal from the sensor 10 to generate an analog signal proportional to the rotational speed. The F-V converter 11 may be of any conventional type and comprises, for example, a Schemitt circuit, a monostable multivibrator, and an integrator circuit (not shown). The analog signal thus generated is supplied from the converter 11 to a constant-voltage control circuit 12 and thence to a compensating circuit 13 for an electro-hydraulic convertor (not shown). The constant-voltage control circuit 12 functions to provide a voltage signal corresponding to the analog signal from the F-V converter 11 irrespective of changes in the supply voltage, as will be described below in detail.

In FIG. 2, there is shown a typidal arrangement of the compensating circuit 13 which includes a resistor 15 and a thermistor 16 connected in parallel with each other. The arrangement is shown to include a resistor 17 also, with the resistor 17 connected in series with the parallel combination of the resistor 15 and the thermistor 16. The terminals of the arrangement are defined as $a$ and $b$. The resistor 17 represents the resistance of a solenoid coil (not shown) forming part of the electro-hydraulic converter through which a current signal is caused to flow in order to provide a fluid pressure at the outlet port of the converter (not shown) that is dependent upon vehicle speed. Since the construction of the electro-hydraulic converter does not constitute any part of the present invention, the description of the remaining portions of the converter have been herein omitted for the sake of simplicity of illustration.

With the connection as described above and shown in FIG. 2 and also with the proper selection of the resistor 15 and the thermistor 16, it will be appreciated by those skilled in the art that due to the temperature-compensating action of the thermistor 16 the resistance of the arrangement regarding the terminals $a$ and $b$ is maintained at a constant value irrespective of changes in the surrounding temperature. Thus, it should be noted that, in the illustrated embodiment, control of the fluid pressure is accomplished by varying the voltage across the terminals $a$ and $b$ in accordance with vehicle speed to thereby cause a corresponding change in the current flow through the resistance 17.

In FIG. 3, there is shown a typical example of the constant-voltage control circuit 12 for producing the voltage signal to be supplied to the circuit of FIG. 2. Designated by $c$ and $d$ are input terminals of the control circuit 12 which are connected to the F-V converter 11 so as to both be supplied with the analog signal proportional to the wheel's rotational speed therefrom. The input terminal indicated at $c$ is connected to the emitter of a transistor 20 of the NPN type and also to a resistor 21 which in turn is connected to a line 22 leading to the negative pole of a battery or voltage source 23. The other input terminal indicated at $d$ is connected through a Zener diode 25 to the line 22, the diode 25 operating in the breakdown region. Flow of the analog signal through the resistor 21 produces a voltage drop thereacross, thus providing a reference potential for the transistor 20.

The transistor 20 has its collector connected to the base of a transistor 28 which is also of the NPN type. The collector of the transistor 20 is further connected to a resistor 30 which in turn is connected through a Zener diode 31 to the line 22. The Zener diode 31 also operates in the breakdown region so as to make the collector potential of the transistor 20 stable. The resistor 30 is connected through a resistor 33 to the collector of the transistor 28. The collector of the transistor 28 is connected to a line 34 leading to the positive pole of the battery 23.

The emitter of the transistor 28 is connected to the terminal indicated at $a$ (see FIG. 2) and also to a resistor 36. The resistor 36 is connected through resistors 37 and 38 to the line 22 which in turn leads to the terminal indicated at $b$ (see FIG. 2). The base of the transistor 20 is connected to the resistor 37.

The Zener diode 25 is connected through a resistor 40 to the line 34. Since the Zerner diode 25 is arranged for operation in the breakdown region, it determines the maximum voltage between the terminals $a$ and $b$, as will be described later.

In the operation of the circuit shown in FIG. 3, the voltage across the resistor 21 forms a reference potential for the transistor 20 that is proportional to the analog signal supplied between the input terminals $c$ and $d$. When any change in the supply voltage occurs, the transistor 20 operates to detect such change for comparison with the reference potential and then to control the base of the transistor 28 in such a manner that the emitter potential thereof returns to its original level. Thus, the output voltage appearing between the terminals $a$ and $b$ remains stable in spite of changes in the supply voltage.

However, as the input signal increases with vehicle speed, the reference potential rises, causing a corresponding decrease in the output voltage. The output voltage is supplied to the circuit of FIG. 2, causing a flow of current dependent upon vehicle speed. Since, as described above, the resistance of the circuit of FIG. 2 regarding the terminals $a$ and $b$ is held constant in spite of changes in the surrounding temperature, the current flowing through the resistor 17 depends merely upon vehicle speed. Provision of the Zener diode 25 operating in the breakdown region determines the minimum reference potential for the transistor 20, and the maximum output voltage is thereby determined.

Turning back to FIG. 1, the device according to the invention further includes first and second safety circuits 50 and 51 for detecting certain malfunctions of the vehicle speed sensor 10 and the constant-voltage control circuit 12, respectively. These safety circuits 50 and 51 are connected to a NAND gate 52 which in turn is connected to an electric lamp 53. The electric lamp 53 is adapted to be lighted to give a warning if certain malfunctions occur in their corresponding members. According to one feature of the invention, the safety circuits 50 and 51 function to disable the constant-voltage control circuit 12, upon detection of the certain malfunctions, in a manner to render the output voltage zero. When this occurs, there is no current flow through the resistor 17, so that the resistance to turning the steering wheel is increased for safety.

In FIG. 4, there is shown a typical example of the first safety circuit 50 which is connected to a winding 55 of the vehicle speed sensor 10. As illustrated, the winding 55 is connected to a voltage divider 56 which is connected to the base of a transistor 57 of the NPN type. The transistor 57 has its collector connected to a plus 12 volts line and its emitter grounded. If the winding 55 breaks, the transistor 57 is rendered conductive, causing the collector potential to drop to near zero.

Figure 5:
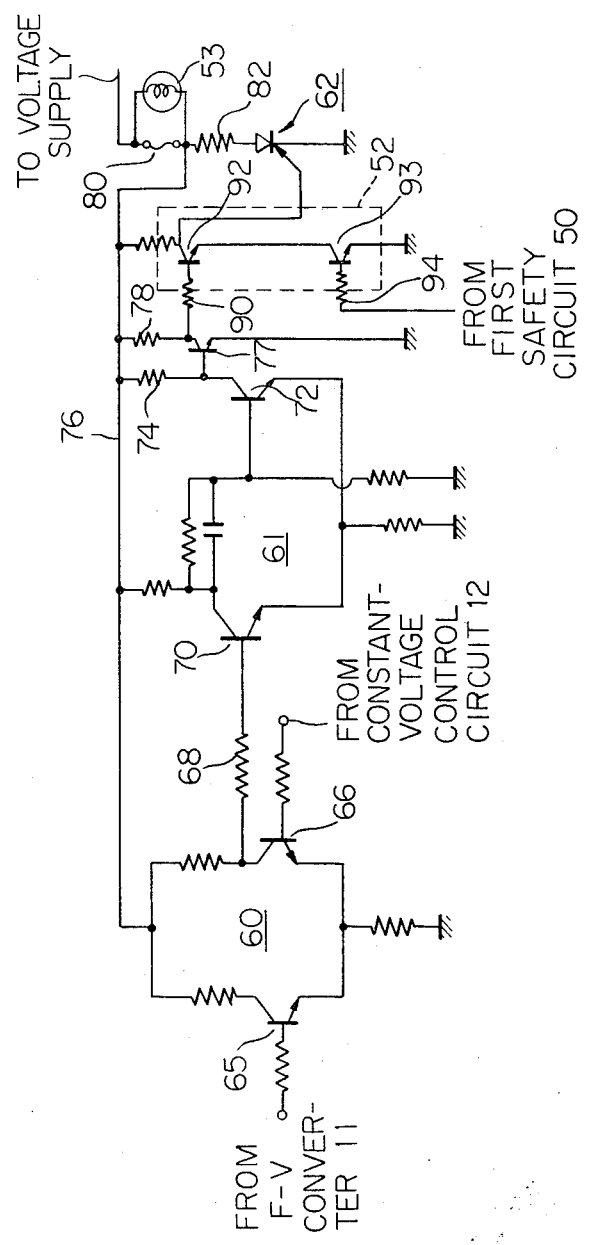
FIG. 5 is an illustration of a second safety circuit employed in the device of FIG. 1.

In FIG. 5, there is shown one example of the second safety circuit 51 which comprises a differential amplifier 60, a Schmitt circuit 61 and a silicon controlled rectifier (SCR) 62. The differential amplifier 60 is of a conventional type including two transistors 65 and 66. The transistor 65 has supplied to its base the analog signal which is supplied from the F-V converter 11. Supplied to the base of the transistor 66 is a voltage signal proportional to the output of the control circuit 12, which is, for example, the voltage appearing at the base of the transistor 20 (see FIG. 3).

The output of the differential amplifier 60 is derived from the collector of the transistor 66 and is connected through a resistor 68 to the base of a transistor 70 which forms a part of the Schmitt circuit 61. The Schmitt circuit 61 is also of a conventional construction and includes a transistor 72 in addition to the transistor 70. The transistor 72 has its collector connected to a line 76 through a resistor 74, the line 76 providing a bus line for the differential amplifier 60 and the Schmitt circuit 61. The collector of the transistor 72 is also connected to the base of a transistor 77 having its emitter grounded. The collector of the transistor 77 is connected to the bus line 76 through a resistor 78 and also to one input of the NAND gate 52 (see FIG. 1) through a resistor 90. The NAND gate 52 comprises two transistors 92 and 93 which are connected in series between the bus line 76 and the ground. The base of the transistor 93 is connected through a resistor 94 to the first safety circuit 50, and to the collector of the transistor 57 (see FIG. 4). The collector of the transistor 92 is connected to the gate of the SCR 62.

The SCR 62 has its cathode grounded and its anode connected to a fuse 80 through a resistor 82. The fuse 80 is connected to a voltage source such as a battery (not shown). As shown, the electric lamp 53 is connected between the fuse 80 and the line 76.

Figure 6:
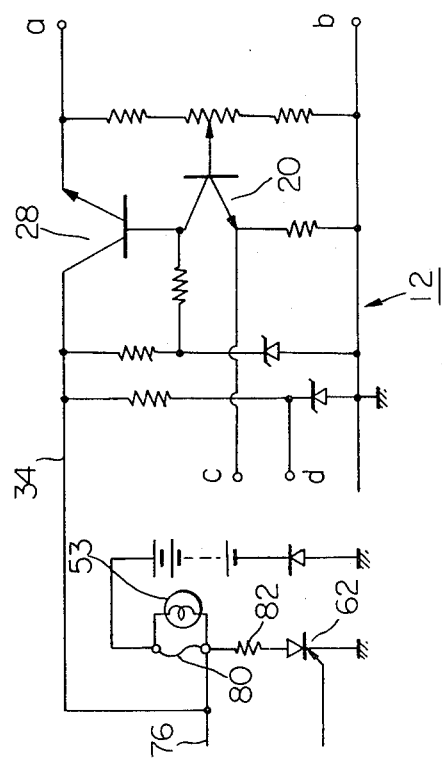
FIG. 6 is an illustration of the manner in which the second safety circuit of FIG. 5 is connected to the constant-voltage control circuit of FIG. 3.

Now, if the constant-voltage circuit 12 malfunctions, the output of the differential amplifier 60 which represents the difference between the two input voltages thereof rises to such a level as to render the transistor 70 conductive. Conduction of the transistor 70 momentarily renders the transistors 72 nonconductive, so that the collector potential of the transistor 72 rises to a level approximately equal to the supply voltage. This renders the SCR 62 conductive and accordingly causes the fuse 80 to burn out. As a result, the electric lamp 53 is lighted and the voltage on the line 76 drops to near zero. If the line 76 is connected to the bus line 34 for the constant-voltage control circuit 12 as is seen in FIG. 6, the control circuit 12 is disabled upon buring out of the fuse 80, so that the output voltage of the control circuit 12 decreases to near zero.

What is claimed is:

1. An electric control apparatus to provide a vehicle speed dependent current for feeding to a modulator valve of a vehicle power steering device, said apparatus comprising:
   sensor means for sensing the vehicle speed to generate an AC current with a frequency proportional thereto;
   converter means for converting the AC current into a DC current of a magnitude proportional thereto;
   control means responsive to the DC current for providing a voltage output corresponding thereto; and
   compensating means for compensating for the variations in the resistance of a solenoid coil of the modulator valve, the compensating means being responsive to the voltage output from the control means to cause current to flow through the solenoid coil the magnitude of which current corresponds exactly to the vehicle speed irrespective of changes in the surrounding temperature.

2. The apparatus as claimed in claim 1, in which said control means comprises a constant-voltage control circuit including first and second transistors, the first transistor having its emitter connected to a resistor through which the DC current from the converter means flows to provide a reference potential for the first transistor, the collector of the first transistor being connected to the base of the second transistor.

3. The apparatus as claimed in claim 2, in which a Zener diode is provided for determining the maximum output voltage of the control means, the Zener diode being connected in series with the resistor and being arranged for operation in the breakdown region.

4. The apparatus as claimed in claim 1, in which said compensating means comprises a thermistor and a resistor connected in parallel to each other, the parallel-connected thermistor and resistor being connected in series with the solenoid coil of the modulator valve.

5. The apparatus as claimed in claim 1, further comprising a first safety circuit for detecting malfunctions in the sensor means to disable the control means upon detection of the malfunctions.

6. The apparatus as claimed in claim 5, in which said first safety circuit comprises a voltage divider connected to said sensor means and a switching circuit connected to an output of said voltage divider, the output of said switching circuit being connected to said control means so as to disable said control means upon detection of the malfunctions in the sensor means.

7. The apparatus as claimed in claim 5, further comprising a second safety circuit for detecting malfunctions in the control means to disable the control means upon detection of the malfunctions.

8. The apparatus as claimed in claim 7, in which said second safety circuit comprises a differential amplifier having two inputs, one connected to the converter means and the other to the control means, a Schmitt circuit having its input connected to the output of the differential amplifier, the output of the Schmitt circuit being connected to said control means so as to disable said control means upon detection of the malfunctions in the control means.

9. The apparatus as claimed in claim 1, further comprising a warning means to give warning if the malfunctions occur in the sensor means and the control means.

10. The apparatus as claimed in claim 9, in which said warning means comprises a NAND circuit having two inputs, one connected to the output of the first safety circuit and the other to the output of the second safety circuit, and an output, a silicon-controlled rectifier having its gate connected to the output of the NAND circuit, a fuse having one end connected to the anode of the silicon-controlled rectifier and an other end connected to a voltage supply, and an electric lamp connected across the fuse.

* * * * *